(12) United States Patent
Girard et al.

(10) Patent No.: US 8,764,398 B2
(45) Date of Patent: Jul. 1, 2014

(54) CONCENTRATED-MASS DEVICE FOR REDUCING VIBRATION GENERATED BY A ROTORCRAFT LIFT ROTOR, AND A ROTOR HUB FITTED WITH SUCH A DEVICE

(75) Inventors: Vincent Girard, Venelles (FR); Stéphane Mazet, Munich (DE)

(73) Assignee: Airbus Helicopters, Marignane Cedex (FR)

( * ) Notice: Subject to any disclaimer, the term of this patent is extended or adjusted under 35 U.S.C. 154(b) by 1099 days.

(21) Appl. No.: 12/762,579

(22) Filed: Apr. 19, 2010

(65) Prior Publication Data
US 2010/0296930 A1 Nov. 25, 2010

(30) Foreign Application Priority Data
May 20, 2009 (FR) ...................... 09 02454

(51) Int. Cl.
| F01D 5/00 | (2006.01) |
| B63H 5/125 | (2006.01) |
| F03B 3/12 | (2006.01) |
| F04D 29/34 | (2006.01) |

(52) U.S. Cl.
USPC .............. 416/134 A; 416/210 R; 416/500; 416/206; 416/137

(58) Field of Classification Search
USPC .............. 416/210 R, 206, 500, 137, 134 A
See application file for complete search history.

(56) References Cited

U.S. PATENT DOCUMENTS

| 4,239,455 A | | 12/1980 | Broekhuizen et al. |
| 4,255,084 A | * | 3/1981 | Mouille et al. ................ 416/145 |
| 4,281,967 A | * | 8/1981 | Mouille et al. ................ 416/145 |
| 4,372,431 A | | 2/1983 | Desjardins |
| 4,596,513 A | | 6/1986 | Carlson et al. |
| 5,639,214 A | | 6/1997 | Guimbal |
| 5,647,726 A | * | 7/1997 | Sehgal et al. ................ 416/145 |
| 5,775,472 A | | 7/1998 | Osterberg et al. |
| 6,045,090 A | * | 4/2000 | Krysinsky et al. ......... 244/17.27 |
| 6,443,273 B1 | * | 9/2002 | Ledbetter et al. ............ 188/379 |
| 6,494,680 B2 | | 12/2002 | Cardin |
| 2003/0173725 A1 | * | 9/2003 | Noe ......................... 267/140.14 |
| 2011/0097193 A1 | * | 4/2011 | Manfredotti ................. 415/119 |

FOREIGN PATENT DOCUMENTS

| EP | 0 790 180 A1 | 8/1997 |
| FR | 2 416 838 A1 | 9/1979 |
| FR | 2 416 839 A1 | 9/1979 |
| FR | 2 435 391 A1 | 4/1980 |
| FR | 2 575 800 A1 | 7/1986 |
| FR | 2 733 483 A1 | 10/1996 |
| FR | 2 749 901 A1 | 12/1997 |
| FR | 2 808 256 A1 | 11/2001 |
| WO | 2005/079200 A2 | 9/2005 |

OTHER PUBLICATIONS

French Search Report, dated Feb. 5, 2010, from corresponding French application.

* cited by examiner

*Primary Examiner* — Edward Landrum
*Assistant Examiner* — Su Htay
(74) *Attorney, Agent, or Firm* — Brooks Kushman P.C.

(57) ABSTRACT

A concentrated-mass device including a main oscillating mass held radially in a horizontal plane by main resilient means inside a casing suitable for being secured to the hub is provided. The device includes a secondary main oscillating mass suspended by secondary resilient means inside a recess in said main oscillating mass to oscillate along a vertical axis perpendicular to the horizontal plane, the secondary oscillating mass being constrained to move in translation together with the main oscillating mass in the horizontal plane.

14 Claims, 2 Drawing Sheets

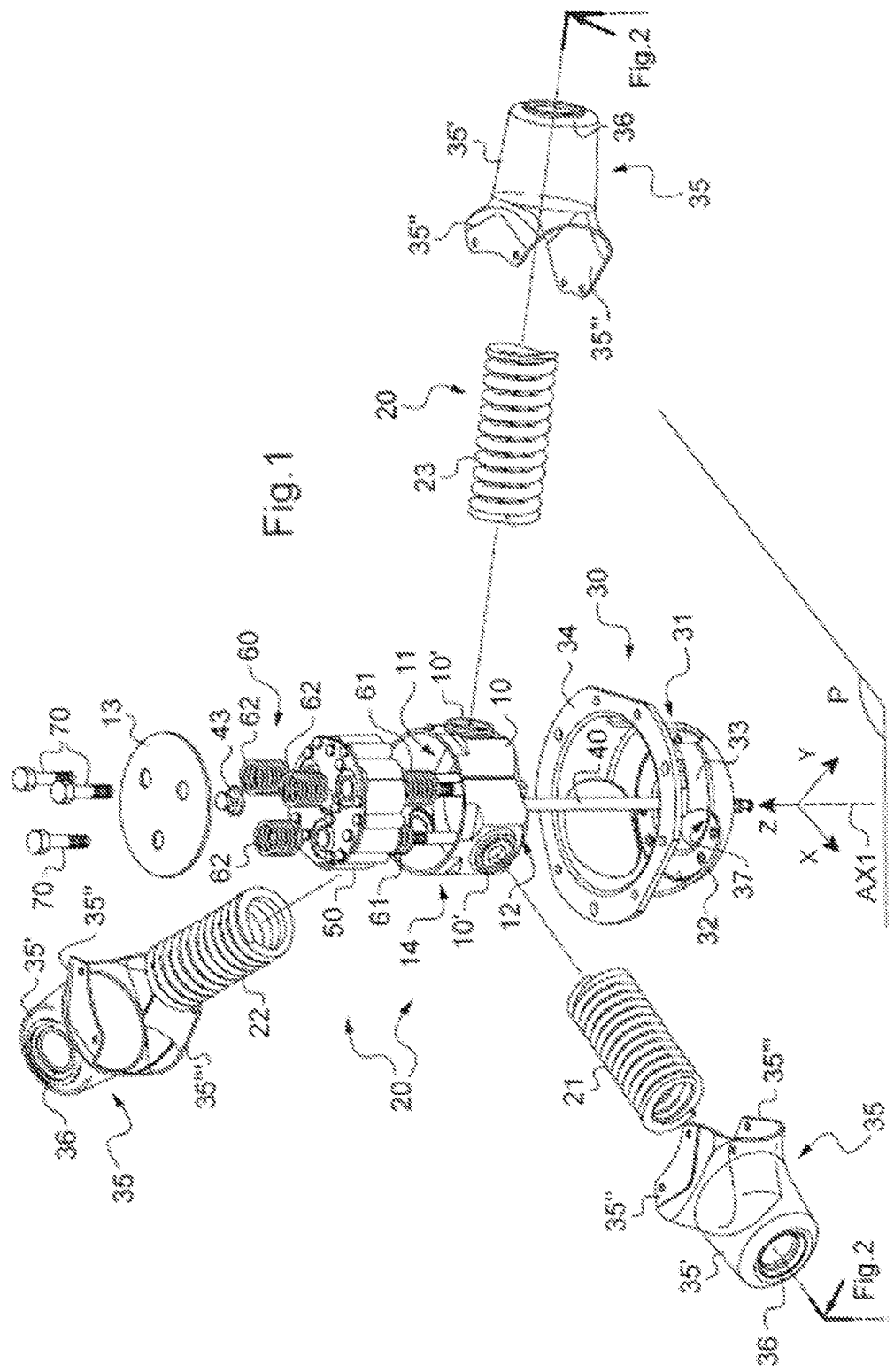

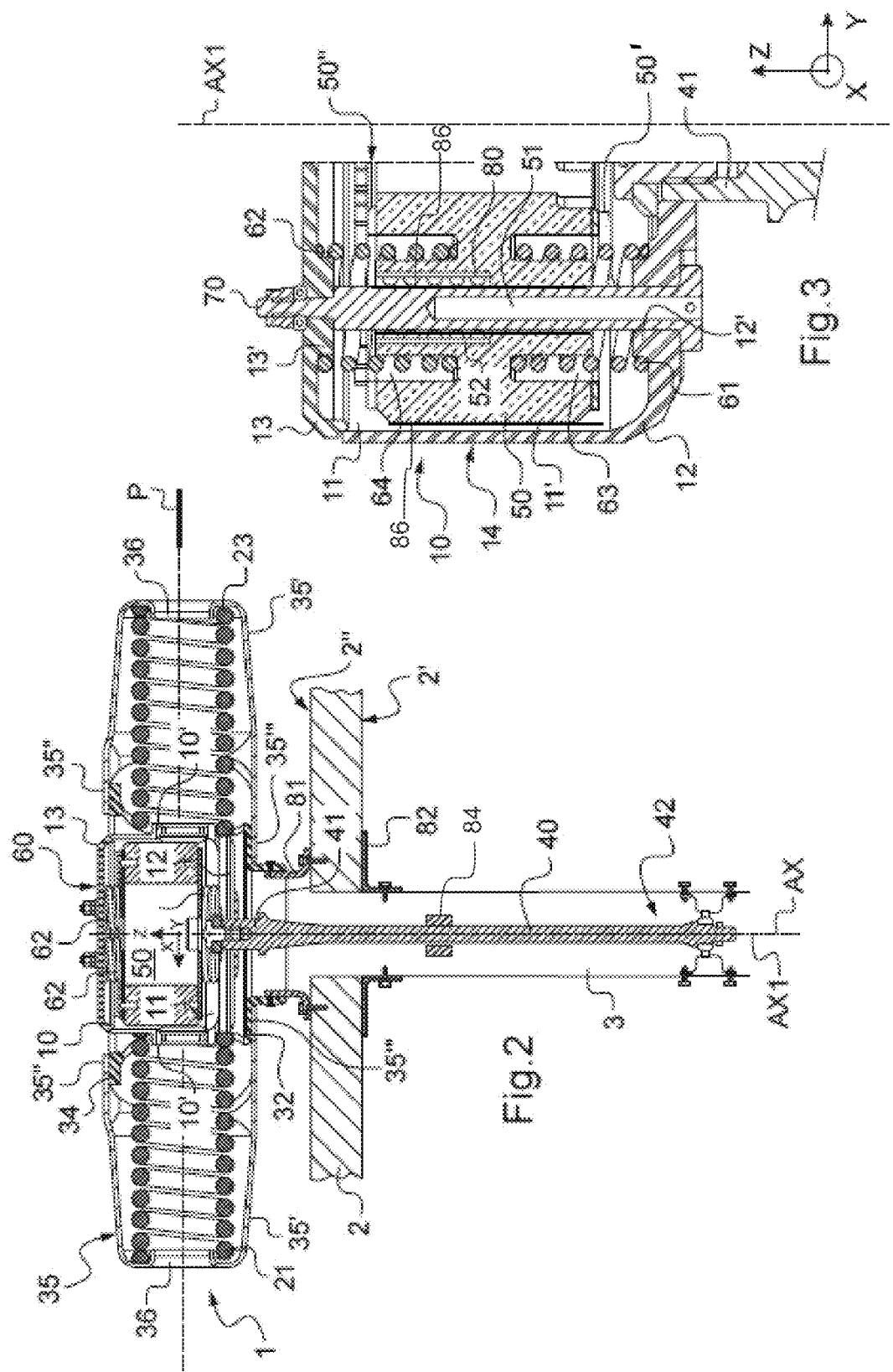

CONCENTRATED-MASS DEVICE FOR REDUCING VIBRATION GENERATED BY A ROTORCRAFT LIFT ROTOR, AND A ROTOR HUB FITTED WITH SUCH A DEVICE

FIELD OF THE INVENTION

The present invention relates to a concentrated-mass device for reducing the vibration generated by a rotorcraft lift rotor, and to the hub of a rotor fitted with such a device.

The operation of a rotorcraft lift rotor, e.g. a main lift and propulsion rotor of a helicopter, generates parasitic forces in the head of the lift rotor. These parasitic forces then give rise to vibration that propagates in the fuselage, which vibration is particularly perceptible in the cockpit of the rotorcraft.

BACKGROUND OF THE INVENTION

To mitigate that drawback, devices have been made that are arranged on the rotor head. In a first solution, devices are known that seek to concentrate an oscillating mass in the vicinity of the axis of rotation of the rotor, which devices are referred to as "concentrated-mass devices" for convenience.

According to document FR 2 416 838, a first concentrated-mass device is mounted on the top portion of the hub in order to reduce said vibration.

That first concentrated-mass device includes an oscillating mass that is held radially in a housing that is secured to the hub by resilient means. The mass is also fastened to the top end of a rod.

The rod is placed substantially on the axis of rotation of the rotor in a recess in the rotor mast of the rotor. The bottom end of the rod is then hinged at a point that is situated on the axis of rotation of the rotor.

Thus, with the resilient means tending to keep the oscillating mass in a rest position, the oscillating mass moves in a plane that is substantially parallel to the top portion of the lift rotor hub, i.e. in a plane that is substantially perpendicular to the vertical axis of rotation of the rotor. The oscillating mass then directly opposes the vibration generated by the rotor.

However, the forces that induce the vibration that is to be reduced and that is generated in a rotor head may be described by a force torque, sometimes referred to by the person skilled in the art as the "rotor head torque". The rotor head torque is then made up of three moments together with three resultant forces relative to three mutually perpendicular axes, namely:

two axes referred to, for convenience below, as the "first and second resultant axes" defining a plane referred to below as the "first resultant plane" extending parallel to the top portion of the rotor hub and thus substantially perpendicular to the vertical axis of rotation of the rotor; and an axis referred to below as the "third resultant axis" that is perpendicular to said first resultant plane.

The first concentrated-mass device is then effective in filtering the resultant forces of the "rotor head torque" along the first and second resultant axes that are substantially parallel to the plane containing said oscillating mass, but is ineffective for the resultant force of the "rotor head torque" along the third resultant axis that is substantially parallel to the axis of rotation of the lift rotor and perpendicular to the plane containing the oscillating mass.

Furthermore, since the oscillating mass used is constant, the first device is particularly effective when the excitation frequency of the vibration that is to be reduced is close to the resonant frequency of said oscillating mass, which frequency is in fact constant.

The first concentrated-mass device is thus not really suitable for variable frequencies.

To remedy that, a second concentrated-mass device is disclosed in document FR 2 749 901.

Like the first concentrated-mass device, the second concentrated-mass device has a main oscillating mass held radially in a housing. In addition, it is provided with an adjuster oscillating mass suitable for sliding along the rod that is secured to the main oscillating mass and that is hinged at a point situated on the axis of rotation of the rotor.

By moving the adjuster oscillating mass, it then becomes possible to adapt the device so as to enable it to reduce vibration at varying frequencies.

Nevertheless, it continues not to filter the resultant forces of the "rotor head torque" along all three mutually perpendicular axes, in particular it does not filter vibration along the third resultant axis that is substantially parallel to the axis of rotation of the lift rotor.

Document FR 2 575 800 presents a vibration damper for a helicopter rotor hub, which damper is provided with a central oscillating mass suspended by mechanical and pneumatic springs inside an outer casing so as to be free to move along three mutually perpendicular directions.

Thus, a single mass is used for combating all three resultant forces of the "rotor head torque".

Although effective, that damper is limited by the fact that the excitation along the third resultant axis differs from the excitation along the first and second resultant axes. As a result that device is difficult to tune.

In the same manner, Document EP 0 790 180 provides for suspending a central oscillating mass by a plurality of springs, the central oscillating mass also being arranged on a movement limiter extending along a vertical axis.

Finally, document U.S. Pat. No. 6,443,273 discloses the possibility of suspending a central mass in a casing by means of springs.

It should be observed that unlike the first above-mentioned solution, a second solution seeks to distribute the oscillating masses about the axis of rotation of the lift rotor by means of devices that are referred to as "distributed mass devices" for convenience.

Document WO 2005/079200 presents a first distributed mass device having two coaxial masses and control means, the control means being suitable for controlling the angular velocity of said masses and their relative angular position.

Like the first and second concentrated-mass devices, the first distributed mass device appears to be insufficient to counter the resultant forces of the "rotor head torque" along three mutually perpendicular axes, and more particularly to counter the resultant force along the third resultant axis that is substantially parallel to the axis of rotation of the lift rotor.

Similarly, Document FR 2 435 391 presents a second distributed mass device having two masses fastened to a shaft passing through the cuff connecting the blade to the hub of a lift rotor.

Document FR 2 808 256 presents a third distributed mass device provided with oscillating masses located between the blades.

Each oscillating mass is then connected by a pivoting connection to an arm of a support secured to the rotor hub in such a manner as to constitute a pendulum.

Under those conditions, the third distributed mass device would appear to be capable of countering the resultant forces of the "rotor head torque" along three mutually perpendicular axes.

However, it is particularly difficult to adjust the third distributed mass device, which device is effective either in countering the resultant forces of the "rotor head torque" along the first and second resultant axes substantially parallel to the plane containing the support of the masses, or else it is effective in countering the resultant force of the "rotor head torque" along the third resultant axis that is substantially parallel to the axis of rotation of the lift rotor.

Document FR 2 733 483 presents a fourth distributed mass device having at least one pendular body mounted on the rotor so as to be capable of oscillating about a pendular movement axis that is spaced apart from the center of inertia of the pendular body.

Consequently, the state of the art provides either devices that are suitable for filtering the resultant forces of the "rotor head torque" along one or two axes, or else devices that are suitable for filtering the resultant forces of the "rotor head torque" along three mutually perpendicular axes, but that are relatively difficult to adjust to obtain results that are of good performance along all three mutually perpendicular axes.

OBJECT AND SUMMARY OF THE INVENTION

An object of the present invention is thus to provide a device for reducing the vibration generated by a rotorcraft lift rotor, which device is effective in countering the resultant forces of the "rotor head torque" along all three of its mutually perpendicular axes.

According to the invention, a concentrated-mass device for reducing the vibration generated by a rotorcraft lift rotor having a hub comprises a main oscillating mass held radially in a horizontal plane by main resilient means within a casing suitable for being secured to the hub, the main oscillating mass being fastened to a top end of a rod, the rod being suitable for extending longitudinally along an axis of rotation of the lift rotor and of the hub so that a bottom end of the rod is hinged to the inside of a rotor mast of the lift rotor.

It should be observed that the plane in which the main oscillating mass is held is referred to for convenience as the "horizontal" plane insofar as, when the concentrated-mass device is arranged on a rotorcraft rotor:
    said plane is substantially horizontal when the rotorcraft is standing on the ground; and
    said plane is perpendicular to the vertical axis of rotation of a rotor.

This concentrated-mass device is remarkable in particular in that it includes a secondary oscillating mass suspended by secondary resilient means inside a recess in the main oscillating mass to oscillate along a vertical axis perpendicular to the horizontal plane, the secondary oscillating mass being constrained to move in translation together with the main oscillating mass in the horizontal plane.

Consequently, the secondary oscillating mass is fastened by secondary resilient means inside the main oscillating mass so as to be capable of moving along a vertical axis relative to the main oscillating mass that receives it.

As a result, the main oscillating mass and the secondary oscillating mass are suitable for moving together in a horizontal plane parallel to the first resultant plane of the "rotor head torque" in order to filter the resultant forces of said "rotor head torque" along the first and second resultant axes.

Furthermore, the secondary oscillating mass suspended inside the main oscillating mass is suitable for moving about an equilibrium position in a vertical direction perpendicular to the horizontal plane in which the main oscillating mass moves about a rest position. The secondary oscillating mass then filters the resultant force of the "rotor head torque" along a third resultant axis.

Consequently, the concentrated-mass device of the invention is easily adjustable, since only the secondary oscillating mass acts along said third resultant axis.

The concentrated-mass device of the invention may also include one or more of the following additional characteristics.

The main oscillating mass includes a bottom portion forming a box suitable for receiving the secondary oscillating mass and a top portion closing the bottom portion, and the device includes at least one fastener pin for fastening the top portion to the bottom portion and passing through a fastener orifice passing through the secondary oscillating mass.

Under such circumstances, the top portion is secured to the bottom portion of the main oscillating so as to define internally a recess in which the secondary oscillating mass is arranged.

Furthermore, in another aspect of the invention, the concentrated-mass device advantageously includes guide means for guaranteeing that the secondary oscillating mass moves inside the main oscillating mass along a vertical direction that is parallel to or that coincides with the third resultant axis. The guide means then prevent undue stresses appearing as a result of uncontrolled friction, for example.

In a first variant, the main oscillating mass includes a bottom portion forming a box suitable for receiving the secondary oscillating mass and a top portion closing said bottom portion, the top and bottom portions being connected together by at least one fastener pin, and said guide means comprises at least said fastener pin.

The movement in translation of the secondary oscillating mass relative to the main oscillating mass and along the vertical axis is then guided by the fastener pin(s) serving to fasten the top portion of the oscillating mass to its bottom portion.

In addition, the guide means may include at least one ball bushing arranged in a guide orifice in the secondary oscillating mass about a fastener pin in order to facilitate movement in translation of the secondary oscillating mass. The guide orifice is blind, partially blind, or a through orifice.

In a second variant that may be combined with the first variant, the guide means comprise at least one ball bushing arranged between the main oscillating mass and the secondary oscillating mass. The ball bushing then surrounds the secondary oscillating mass.

Similarly, the guide means may comprise at least one ring covered in a self-lubricating material and arranged in a guide orifice of the secondary oscillating mass about a fastener pin in order to facilitate movement in translation of the secondary oscillating mass, and/or at least one ring covered in a self-lubricating material arranged between the main oscillating mass and the secondary oscillating mass.

Reference may be made to the literature to obtain any information that may be required concerning ball bushings, also known as "linear bearings".

Furthermore, the secondary resilient means comprise at least one bottom spring and at least one top spring, the bottom spring being prestressed between a bottom portion of the main oscillating mass and the secondary oscillating mass, while the top spring is prestressed between a top portion of the main oscillating mass and a top face of the secondary oscillating mass.

The bottom and top portions of the main oscillating mass are connected together by at least one fastener pin, and a top spring and a bottom spring are disposed around each fastener pin.

Finally, the concentrated-mass device optionally includes an adjustment mass arranged on the rod.

In addition to a concentrated-mass device for reducing the vibration generated by a lift rotor, the invention also provides a hub for a rotorcraft lift rotor that is provided with a bottom zone that is suitable for being secured to a rotorcraft rotor mast.

Such a hub is then remarkable in that it includes a top zone substantially parallel to said bottom portion and constrained to rotate together with the casing of a concentrated-mass device of the invention.

BRIEF DESCRIPTION OF THE DRAWINGS

The invention and its advantages appear in greater detail from the following description of embodiments given by way of illustration and with reference to the accompanying figures, in which:

FIG. 1 is an exploded view of a concentrated-mass device of the invention;

FIG. 2 is a 120 degree section of the concentrated-mass device of FIG. 1; and

FIG. 3 is a fragmentary section of a main oscillating mass of the invention.

MORE DETAILED DESCRIPTION

Elements present in more than one of the figures are given the same references in all of them.

It should be observed that three mutually orthogonal axes X, Y, and Z are shown in FIGS. 1 and 2, the forces resulting from a "rotor head torque" being directed parallel to these three axes.

The axes X and Y are referred to respectively as the "first horizontal axis", and as the "second horizontal axis". The first and second horizontal axes together define a horizontal plane P.

In contrast, the axis Z is said to be a "vertical axis". This vertical axis Z is thus perpendicular to the horizontal plane P.

FIGS. 1 and 2 show a concentrated-mass device 1 of the invention. More precisely, FIG. 1 is an exploded view of the concentrated-mass device 1, whereas FIG. 2 is a section of FIG. 1 on a section line referenced "FIG. 2".

The concentrated-mass device 1 has a casing 30 suitable for being secured to the hub of a lift rotor.

In the embodiment described, the casing 30 is in the form of a star having three points that are distributed in equidistant manner.

More precisely, and with reference to FIG. 2, the casing 30 is fastened via a first collar 81 to the top zone 2" of the hub 2, the bottom zone 2' of the hub 2 being secured by a second collar 82 to a rotor mast 3 of the lift rotor.

Thus, with reference to FIGS. 1 and 2, the casing 30 comprises a hollow shell 31 provided vertically with a bottom lip 32 directed towards the inside of the shell 31, with an intermediate portion 33, and with a top lip 34 directed towards the outside of the shell 31.

In order to secure the casing 30 to the hub 2, the bottom lip 32 of the shell 31 is fastened by conventional means of the bolt type to the first collar 81.

Furthermore, the casing 30 possesses blocking means 35, each blocking mean 35 having a frustoconical element 35' extended by a bottom cheek 35''' and by a top cheek 35''. The bottom and top cheeks 35''' and 35'' of a blocking means 35 are fastened respectively to the bottom and top lips 32 and 34 of the shell 31, e.g. by screws.

Consequently, the casing 30 is star-shaped with the shell 31 occupying the center of the star while the frustoconical elements 35' of the blocking means 35 represent the points of the star.

It should be observed that the blocking means 35 extend radially from the shell 31 and that they are distributed in equidistant manner around the shell 31.

In order to filter the forces that result from the "rotor head torque" in the first resultant plane, parallel to the horizontal plane P, the concentrated-mass device 1 includes a main oscillating mass 10 made of a dense material and suitable for being placed at the head of a rotorcraft lift rotor.

For this purpose, the main oscillating mass 10 is held radially in a horizontal plane P by main resilient means 20 inside the shell 31 of the casing 30 of the concentrated-mass device 1 so as to be concentrated in the proximity of the axis of rotation AX of the lift rotor.

Thus, the main resilient means 20 comprise springs 21, 22, and 23 arranged in the blocking means 35.

Under such circumstances, with each blocking means including a shoulder 36 inside its frustoconical element 35' at a distance from its bottom and top cheeks 35''' and 35'', each spring is prestressed between a shoulder 36 of one of the blocking means 35 and a projection 10' of the main oscillating mass 10. The casing 30 has three points in the example shown, so the main oscillating mass 10 is provided with three projections 10' that co-operate with three springs 21, 22, and 23 of the main resilient means 20.

More precisely, since the main mass 10 has a bottom portion 12 facing the bottom lip 32 and a top portion 13 facing the top lip 34, the bottom portion 12 is in the form of a box, specifically, a cup, with side walls 14 that are provided with said projections 10'.

It should be observed that the bottom and top portions 12 and 13 are connected together by at least one fastener pin 70. Since the bottom portion 12 is in the form of a cup, the main oscillating mass 10 has a recess 11 inside it when the bottom and top portions 12 and 13 are connected together.

In addition, the main oscillating mass 10 is fastened by clamping means to a top end 41 of a rod 40 that extends longitudinally along the axis of rotation AX of the lift rotor of the hub 2 and of the concentrated-mass device 1 of the invention. For this purpose, the shell 31 is provided with an opening 37 so that the rod 40 can project from the casing 30 and extend inside the rotor mast 3.

The bottom end 42 of the rod 40 is then hinged inside the rotor mast 3 of the lift rotor by means of a ball joint.

As an option, the rod 40 may include an adjuster mass 84 illustrated in FIG. 2.

Furthermore, the concentrated-mass device 1 of the invention advantageously includes a secondary oscillating mass 50 that is suspended by secondary resilient means 60, at least one bottom spring 61 and at least one top spring 62, inside the recess 11 in the main oscillating mass 10.

The secondary oscillating mass 50 thus moves in the horizontal plane P together with the main oscillating mass 1. In contrast, the secondary oscillating mass is suitable for moving about a rest position along a vertical axis AX1 perpendicular to the horizontal plane P inside the main oscillating mass 50, and thus relative to said main oscillating mass 50.

The main resilient means, i.e. the springs 21, 22, and 23, then tend to return the main oscillating mass resiliently towards a rest position. Movement of the main oscillating mass in translation, together with its content, in the horizontal plane P then serves to filter said resulting forces of the "rotor head torque" in a first resultant plane.

FIG. 3 is a section view of a main oscillating mass 10 and of a secondary oscillating mass 50 in a preferred variant.

Since the secondary oscillating mass 50 is inserted inside the recess 11 in the main oscillating mass 10, the secondary oscillating mass 50 includes a fastener orifice 51 for engaging a fastener pin 70 to enable said fastener pin 70 to hold together the bottom and top portions 12 and 13 of the main oscillating mass 10.

Each fastener pin thus performs an additional function by constituting guide means for the secondary oscillating mass 50.

Since the fastener axes 70 are parallel to the vertical axis AX1, the secondary oscillating mass is capable of moving in translation only along this vertical axis AX1 relative to the main oscillating mass 10.

Furthermore, the concentrated-mass device 1 is provided with dedicated guide means, namely at least one ball bushing 80 or any other equivalent means serving to provide guidance with little clearance and little friction. More precisely, a guide orifice 52 is made in the oscillating mass around the fastener orifice 51.

The guide orifice 52 may pass right through the secondary oscillating mass, or it may merely be countersunk as in the variant shown in FIG. 3.

It is also possible to arrange a ball bushing 80 around each of the fastener pins 70.

In a variant or in cumulative manner, the concentrated-mass device 1 may include a ball bushing 80 in the space 11' that exists radially between the secondary oscillating mass 50 and the side walls 14 of the main oscillating mass 10.

As a variant, it is possible for the guide means to be constituted by a ring covered in a self-lubricating material 86 such as Teflon® for example, or for it to be made of a material that is known for its low coefficient of friction, such as bronze. Such a ring is then arranged around each of the fastener pins 70 or in the space 11 that extends radially between the secondary oscillating mass 50 and the side wall 14 of the main oscillating mass 10.

FIG. 3 also shows secondary resilient means serving to suspend the secondary oscillating mass 50 inside the main oscillating mass 10.

The secondary resilient means comprise at least one bottom spring 61 and at least one top spring 62.

First end turns of the bottom spring 61 are then disposed in a blind bore 63 formed in the bottom face 50' of the secondary oscillating mass, while second end turns of the bottom spring are disposed around a shoulder 12' of the bottom portion 12 of the main oscillating mass 10.

Similarly, first end turns of the top spring 62 are disposed in a blind bore 64 formed in the top face 50" of the secondary oscillating mass, while second end turns of the top spring 62 are disposed around a shoulder 13' of the top portion 13 of the main oscillating mass 10.

It should be observed that the bores 63, 64 receiving the bottom and top springs 61 and 62, and the shoulders 12', 13' surrounded by the bottom and top springs 61 and 62, are coaxial with respective ones of the fastener pins 70.

It is thus advantageous to place a bottom spring 61 and a top spring 62 around each fastener pin 70.

Consequently, the main and secondary oscillating masses 10 and 50 are constrained to move in translation together in the horizontal plane P so as to act together to filter the forces that result from the "rotor head torque" along the first and second resultant axes defining said first resultant plane, parallel to the horizontal plane P.

Furthermore, the secondary oscillating mass 50 is free to oscillate along a vertical axis inside the main oscillating mass 10 in order to filter the resultant force of the "rotor head torque" along the third resultant axis that coincides with said vertical axis.

In addition, the secondary oscillating mass 50 and/or the main mass 10 may include means for adjusting the value of each of their masses. For example, additional weights may be fastened by conventional means to the top face or the bottom face of said secondary oscillating mass, or indeed to the bottom and top portions of the main oscillating mass.

Naturally, the present invention may be subjected to numerous variations as to its implementation. Although several variants are described above, it will readily be understood that it is not conceivable to identify exhaustively all possible variants. It is naturally possible to envisage replacing any of the means described by equivalent means without going beyond the ambit of the present invention.

What is claimed is:

1. A concentrated-mass device for reducing vibration generated by a rotorcraft lift rotor having a hub, the concentrated-mass device comprising:
    a main oscillating mass held radially in a horizontal plane by main springs within a casing suitable for being secured to the hub, the main oscillating mass being fastened to a top end of a rod, the rod being suitable for extending longitudinally along an axis of rotation of the lift rotor and of the hub so that a bottom end of the rod is hinged to a rotor mast of the lift rotor;
    a secondary oscillating mass suspended by secondary springs inside a recess in the main oscillating mass to oscillate along a vertical axis perpendicular to the horizontal plane, the secondary oscillating mass being constrained to move in translation together with the main oscillating mass in the horizontal plane; and
    a guide member to guide movement of the secondary oscillating mass inside the main oscillating mass
    wherein the main oscillating mass includes a bottom portion forming a box suitable for receiving the secondary oscillating mass and a top portion closing the bottom portion, the top and bottom portions being connected together by at least one fastener pin, and the guide member includes at least the fastener pin, and
    wherein the guide member includes at least one ball bushing formed in a guide orifice of the secondary oscillating mass about the fastener pin.

2. The concentrated-mass device according to claim 1, wherein the guide member includes the at least one ball bushing arranged between the main oscillating mass and the secondary oscillating mass.

3. The concentrated-mass device according to claim 1, wherein the guide member includes a self-lubricating material arranged on one of the main oscillating mass and the secondary oscillating mass.

4. The device according to claim 1, wherein the secondary springs comprise at least one bottom spring and at least one top spring, the bottom spring being pre-stressed between the bottom portion of the main oscillating mass and the secondary oscillating mass, while the top spring is pre-stressed between the top portion of the main oscillating mass and the secondary oscillating mass.

5. The concentrated-mass device according to claim 4, wherein the top spring and the bottom spring are disposed around the at least one fastener pin.

6. The concentrated-mass device according to claim 1, further comprising an adjustment mass arranged on the rod.

7. The concentrated-mass device according to claim 1, wherein the hub of the rotorcraft lift rotor includes a bottom zone suitable for being secured to the rotor mast and a top zone substantially parallel to the bottom zone and constrained to rotate together with the casing.

8. A concentrated-mass device for reducing vibration generated by a rotorcraft lift rotor having a hub, the concentrated-mass device comprising:

a main oscillating mass held radially in a horizontal plane by main springs within a casing suitable for being secured to the hub, the main oscillating mass being fastened to a top end of a rod, the rod being suitable for extending longitudinally along an axis of rotation of the lift rotor and of the hub so that a bottom end of the rod is hinged to a rotor mast of the lift rotor;

a secondary oscillating mass suspended by secondary springs inside a recess in the main oscillating mass to oscillate along a vertical axis perpendicular to the horizontal plane, the secondary oscillating mass being constrained to move in translation together with the main oscillating mass in the horizontal plane; and a guide member to guide movement of the secondary oscillating mass inside the main oscillating mass wherein the main oscillating mass includes a bottom portion forming a box suitable for receiving the secondary oscillating mass and a top portion closing the bottom portion, the top and bottom portions being connected together by at least one fastener pin, and the guide member includes at least the fastener pin, and wherein the guide member includes a self-lubricating material arranged in a guide orifice around the fastener pin of the secondary oscillating mass.

9. A rotorcraft lift rotor having a concentrated-mass device for reducing vibration, the rotor comprising:

a rotor mast of the lift rotor extending longitudinally along an axis of rotation of the rotor;

a rotor hub disposed on the rotor mast and extending longitudinally along the axis of rotation;

a casing secured to the rotor hub;

a main mass disposed in the casing and held suspended radially in the casing by a plurality of main springs such that the main mass oscillates in a horizontal plane to reduce vibration parallel to the horizontal plane, the main mass being fastened to a top end of a rod; and a secondary mass disposed in a recess defined in the main mass, the secondary mass suspended vertically from the casing by a plurality of secondary springs such that the secondary mass oscillates along a vertical axis perpendicular to the horizontal plane to reduce vibration in a vertical direction, wherein the secondary mass is constrained to oscillate with the main mass in the horizontal plane, wherein the plurality of secondary springs comprise at least one bottom spring and at least one top spring, the bottom spring being pre-stressed between a bottom portion of the main mass and the secondary mass, while the top spring is pre-stressed between a top portion of the main mass and the secondary mass, wherein the bottom and top portions of the main mass are connected together by at least one fastener pin, and the top spring and the bottom spring are disposed around the fastener pin.

10. The rotor according to claim 9 wherein the hub includes a bottom zone suitable for being secured to the rotor mast and a top zone substantially parallel to the bottom zone and constrained to rotate together with the casing.

11. The rotor according to claim 9 further comprising an adjustment mass arranged along the rotor mast.

12. A concentrated-mass device for reducing vibration generated by a rotorcraft lift rotor, the concentrated-mass device comprising:

a casing secured to a rotor hub;

a main mass disposed in the casing and held suspended radially in the casing by a plurality of main springs such that the main mass oscillates in a horizontal plane to reduce vibration parallel to the horizontal plane; and a secondary mass disposed in a recess defined in the main mass, the secondary mass suspended vertically from the casing by a plurality of secondary springs such that the secondary mass oscillates along a vertical axis perpendicular to the horizontal plane to reduce vibration in a vertical direction, wherein the secondary mass is constrained to oscillate with the main mass in the horizontal plane, wherein the secondary springs comprise at least one bottom spring and at least one top spring, the bottom spring being pre-stressed between a bottom portion of the main oscillating mass and the secondary oscillating mass, while the top spring is pre-stressed between a top portion of the main oscillating mass and the secondary oscillating mass, and wherein the bottom and top portions of the main oscillating mass are connected together by at least one fastener pin, and the top spring and the bottom spring are disposed around the fastener pin.

13. The concentrated-mass device according to claim 12, further comprising a guide member to guide movement of the secondary oscillating mass inside the main oscillating mass, wherein the guide member includes at least one ball bushing arranged between the main oscillating mass and the secondary oscillating mass.

14. The concentrated-mass device according to claim 12 further comprising:

a rotor rod wherein the main mass is fastened to a top end of the rod, wherein the rod extends longitudinally along an axis of rotation of the lift rotor; and an adjustment mass arranged on the rod.

* * * * *